United States Patent
Xu (10) Patent No.: US 11,972,238 B2
(45) Date of Patent: *Apr. 30, 2024

(54) PROPAGATING REDUCED-PRECISION ON COMPUTATION GRAPHS

(71) Applicant: Google LLC, Mountain View, CA (US)

(72) Inventor: Yuanzhong Xu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/838,710

(22) Filed: Jun. 13, 2022

(65) Prior Publication Data

US 2022/0365763 A1 Nov. 17, 2022

Related U.S. Application Data

(63) Continuation of application No. 16/263,730, filed on Jan. 31, 2019, now Pat. No. 11,385,875.

(51) Int. Cl.
G06F 8/41 (2018.01)
G06F 16/901 (2019.01)
G06N 20/00 (2019.01)

(52) U.S. Cl.
CPC .......... *G06F 8/443* (2013.01); *G06F 16/9024* (2019.01); *G06N 20/00* (2019.01)

(58) Field of Classification Search
CPC ...... G06F 8/443; G06F 16/9024; G06N 20/00
See application file for complete search history.

(56) References Cited

U.S. PATENT DOCUMENTS 5,515,535 A * 5/1996 Frankel .................. G06F 8/443
717/149
6,625,797 B1 9/2003 Edwards
(Continued)

FOREIGN PATENT DOCUMENTS

CN 106650931 5/2017
EP 1930815 6/2008
WO WO 02103483 12/2002

OTHER PUBLICATIONS

Peng, Lina, et al. "Optimization of media processing workflows with adaptive operator behaviors." Multimedia Tools and Applications 33 (2007): 245-272. (Year: 2007).*

(Continued)

*Primary Examiner* — Kevin L Young
*Assistant Examiner* — Joanne G Macasiano
(74) *Attorney, Agent, or Firm* — Fish & Richardson P.C.

(57) ABSTRACT

Methods, systems, and apparatus for propagating reduced-precision on computation graphs are described. In one aspect, a method includes receiving data specifying a directed graph that includes operators for a program. The operators include first operators that each represent a numerical operation performed on numerical values having a first level of precision and second operators that each represent a numerical operation performed on numerical values having a second level of precision. One or more downstream operators are identified for a first operator. A determination is made whether each downstream operator represents a numerical operation that is performed on input values having the second level of precision. Whenever each downstream operator represents a numerical operation that is performed on input values having the second level of precision, a precision of numerical values output by the (Continued)

operation represented by the first operator is adjusted to the second level of precision.

20 Claims, 5 Drawing Sheets

(56) References Cited

U.S. PATENT DOCUMENTS

| | | | |
|---|---|---|---|
| 7,222,317 | B1 | 5/2007 | Mathur |
| 8,209,597 | B2 | 6/2012 | Felch et al. |
| 8,359,281 | B2 | 1/2013 | Cadambi et al. |
| 8,749,576 | B2 | 6/2014 | Hutchins et al. |
| 9,104,474 | B2 | 8/2015 | Kaul et al. |
| 2002/0154247 | A1 | 10/2002 | Ghosh et al. |
| 2003/0061574 | A1* | 3/2003 | Saluja ............... G06F 9/44 716/103 |
| 2003/0061577 | A1 | 3/2003 | Saluja |
| 2009/0281969 | A1* | 11/2009 | Andreev ............ G06F 30/327 706/12 |
| 2014/0289445 | A1 | 9/2014 | Savich |
| 2015/0205589 | A1 | 7/2015 | Dally |
| 2015/0319181 | A1 | 11/2015 | Rao et al. |
| 2015/0378741 | A1* | 12/2015 | Lukyanov ........ G06F 9/30018 712/226 |
| 2019/0286973 | A1 | 9/2019 | Kovvuri |

OTHER PUBLICATIONS

Chang, Mark L. Variable precision analysis for FPGA synthesis. University of Washington, 2004. (Year: 2004).*

Lasri et al., "Implications of reduced-precision computations in HPC: Performance, energy and error," Parallel computing is everywhere, Mar. 7, 2018, p. 297.

Rodriguez et al., "Lower Numerical Precision Deep Learning Inference and Training," Intel, White Paper, Jan. 2018, 19 pages.

Tong et al., "Reducing power by optimizing the necessary precision/range of floating-point arithmetic," IEEE Transactions on Very Large Scale Integration (VLSI) Systems 8.3, 2000, pp. 273-286.

* cited by examiner

PROPAGATING REDUCED-PRECISION ON COMPUTATION GRAPHS

CROSS-REFERENCE TO RELATED APPLICATION

This application is a continuation of, and claims priority to, U.S. application Ser. No. 16/263,730, filed on Jan. 31, 2019. The disclosure of the prior application is considered part of and is incorporated by reference in the disclosure of this application.

BACKGROUND

Machine learning models and other numerical workloads are often expressed as computation graphs of operators on tensors. Such workloads are increasingly executed on machine learning accelerators. These accelerators have limited memory capacity and bandwidth to perform the computations required by the machine learning models and other numerical workloads and therefore often rely on performing at least some of the computations using lower precision numerical values. More precise numerical values require more memory capacity and more bandwidth than less precise numerical values. However, using reduced-precision numerical values can result in less accurate computations.

SUMMARY

This specification describes technologies relating to adjusting operators of machine learning models and other numerical workloads to use reduced-precision values based on the precision of other operators of the workload.

In general, one innovative aspect of the subject matter described in this specification can be embodied in a method that includes receiving data specifying a directed graph that includes operators for a program. Each operator represents a numerical operation performed by a processor. The operators include (i) a set of first operators that each represent a numerical operation performed on numerical values having a first level of precision and (ii) a set of second operators that each represent a numerical operation performed on numerical values having a second level of precision that is a lower level of precision than the first level of precision. For at least a subset of one or more of the first operators, one or more downstream operators are identified for the first operator. Each downstream operator represents a numerical operation performed on an output of the first operator. Each downstream operator is an operator that is performed after the first operator and using the output of the first operator. A determination is made whether each downstream operator represents a numerical operation that is performed on input values having the second level of precision. Whenever each downstream operator for the first operator represents a numerical operation that is performed on input values having the second level of precision, a precision of numerical values output by the operation represented by the first operator is adjusted to the second level of precision. A modified version of the program is generated. The modified version of the program includes each adjusted first operator for which the precision of the numerical values has been adjusted. Other implementations of this and other aspects include corresponding systems, methods, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These and other implementations can each optionally include one or more of the following features. Some aspects can include executing the modified version of the program, including causing one or more processors to perform the operations with the adjusted precision for each of the adjusted first operators.

In some aspects, numerical values having the first level of precision are represented using a first computer number format and numerical values having the second level of precision are represented using a second computer number format different from the first computer number format. The data specifying the directed graph can include a node for each operator and an edge between each pair of sequential operators.

Some aspects can include determining, for a given first operator for which the precision of numerical values output by the given first operator has been adjusted to the second level of precision, that the given first operator is a precision pass-through operator and, in response to determining that the given first operator is a precision pass-through operator, generating data specifying that an input precision of the given operator requires the second level of precision.

Some aspects can include identifying an upstream operator for which an output of the upstream operator is an input to the given first operator, determining whether each downstream operator for the upstream operator represents a numerical operation performed on numerical values having the second level of precision, and, whenever the upstream operator each downstream operator for the upstream operator represents a numerical operation performed on numerical values having the second level of precision, adjusting an output precision of the upstream operator to the second level of precision.

Some aspects can include determining that each upstream operator for which an output of the upstream operator is an input to the given first operator has an output precision that matches the second level of precision and, in response to determining that each upstream operator for which an output of the upstream operator is an input to the given first operator has an output precision that matches the second level of precision, adjusting the input precision of the given first operator to the second level of precision.

Some aspects can include determining, for a particular first operator in the subset of one or more first operators, that (i) at least one first downstream operator for the particular first operator represents a numerical operation performed on numerical values having the first level of precision and (ii) at least one second downstream operator for the particular first operator represents a numerical operation performed on input values having the second level of precision. A determination is made that the at least one second downstream operator will use each output of the particular first operator at least a threshold number of times. In response to determining that the at least one second downstream operator will use each output of the particular first operator at least a threshold number of times, a convert operator is added to the modified version of the program. The convert operator represents an operation that converts each output of the particular first operator to a value having the second level of precision for use by the at least one second downstream operator.

Some aspects can include determining that a particular first operator in the subset of one or more first operators includes a nested computation that is nested within the particular first operator. A determination is made that each downstream operator for the particular first operator represents a numerical operation performed on input values having the second level of precision. In response to determining that each downstream operator for the particular first operator represents a numerical operation performed on input values having the second level of precision, an output precision of the particular first operator is adjusted to the second level of precision, an output precision of the nested computation to the second level of precision, and a determination is made whether an input precision of the nested computation is capable of being adjusted to the second level of precision. Whenever the input precision of the nested computation is capable of being adjusted to the second level of precision, the input precision of the nested computation is adjusted to the second level of precision and an input precision of the particular first operator is adjusted to the second level of precision.

The subject matter described in this specification can be implemented in particular embodiments so as to realize one or more of the following advantages. Increasing the number of operators that use reduced-precision values in a given numerical workload improves the performance of the processor(s) used to execute the workload. For example, increasing the number of reduced-precision operators results in faster computations using less bandwidth and less memory. Increasing the number of reduced-precision operators also allows larger workloads to be executed by processors that otherwise would not be able to execute the workloads.

Moreover, the described techniques can be used to identify operators for which the precision of the values on which operations are performed by the operators can be reduced without negatively affecting the accuracy of the output of the workloads. Thus, the techniques described herein can improve the performance of processors (e.g., hardware processors) that perform machine learning and other numerical computations without negatively affecting the accuracy of the computations.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the subject matter described in this specification relates to improving the performance of processors that execute programs that include machine learning and/or other numerical workloads by propagating reduced-precision to operators in a way that does not negatively affect the accuracy of the computations. Propagating reduced-precision includes reducing the precision of numerical values on which operations of one or more operators are performed based on the precision of other operators being lower than the precision of the one or more operators. Although the techniques are described largely in terms of machine learning computations, the techniques described in this document can be applied to other numerical workloads, such as compression, e.g., video coding/decoding, and numerical methods for solving differential equations.

A machine learning model can include sequences of computations. Some of the computations may be performed using numerical values that have differing levels of precision. For example, a 32-bit floating point format ("F32") for representing numerical values can provide greater precision than a 16-bit floating point format ("F16"). Some operators of a machine learning model may use F32 values while other operators of the machine learning model may use F16 values and/or numerical values represented using different computer number formats with different levels of precision. When the precision of an operator is reduced, the computer number format of numbers input to and/or output by the operator are adjusted to the reduced-precision format.

Many of the examples in this document are described in terms of F32 as a higher precision computer number format and F16 as a lower precision computer number format. However, the techniques and examples described in this document can be similarly applied to machine learning models and other numerical workloads that include other computer number formats with other levels of precision.

A system can propagate reduced-precision to operators in a machine learning model in a way that does not negatively affect the accuracy of the computations. An operator represents a numerical operation, e.g., multiplication, addition, convolution, etc., of a machine learning model or other numerical workload. For example, a machine learning model can be represented by a directed computation graph that includes a node for each operator and an edge between pairs of sequential operators, i.e., such that an edge between two nodes means that an operation represented by one operator receives as input and output generated by an operation represented by another operator. For the purposes of this document, an operator that represents an operation performed on numerical values by a processor may also be referred to as performing the operation on the numerical values for brevity.

The system can evaluate the operators of a machine learning model, e.g., by evaluating the graph, to identify operators that perform operations on higher precision numerical values although lower precision numerical values can be used based on the precision of values used by downstream operators and/or upstream operators. For example, if all downstream operators that perform operations on the output of a particular operator use reduced-precision values relative to the precision of values used by the particular operator and the precision of the input of the particular operator is passed to the output of the particular operator, the system can reduce the precision of the numerical values of the particular operator.

By propagating the reduced-precision values to appropriate operators, the machine learning model requires less storage capacity for storing the values and the computations of the machine learning model can be performed faster. For example, storing an F32 value requires more memory than storing a F16 value. Aggregated over the many numerical values used by a machine learning model, the memory savings can be substantial.

Figure 1:
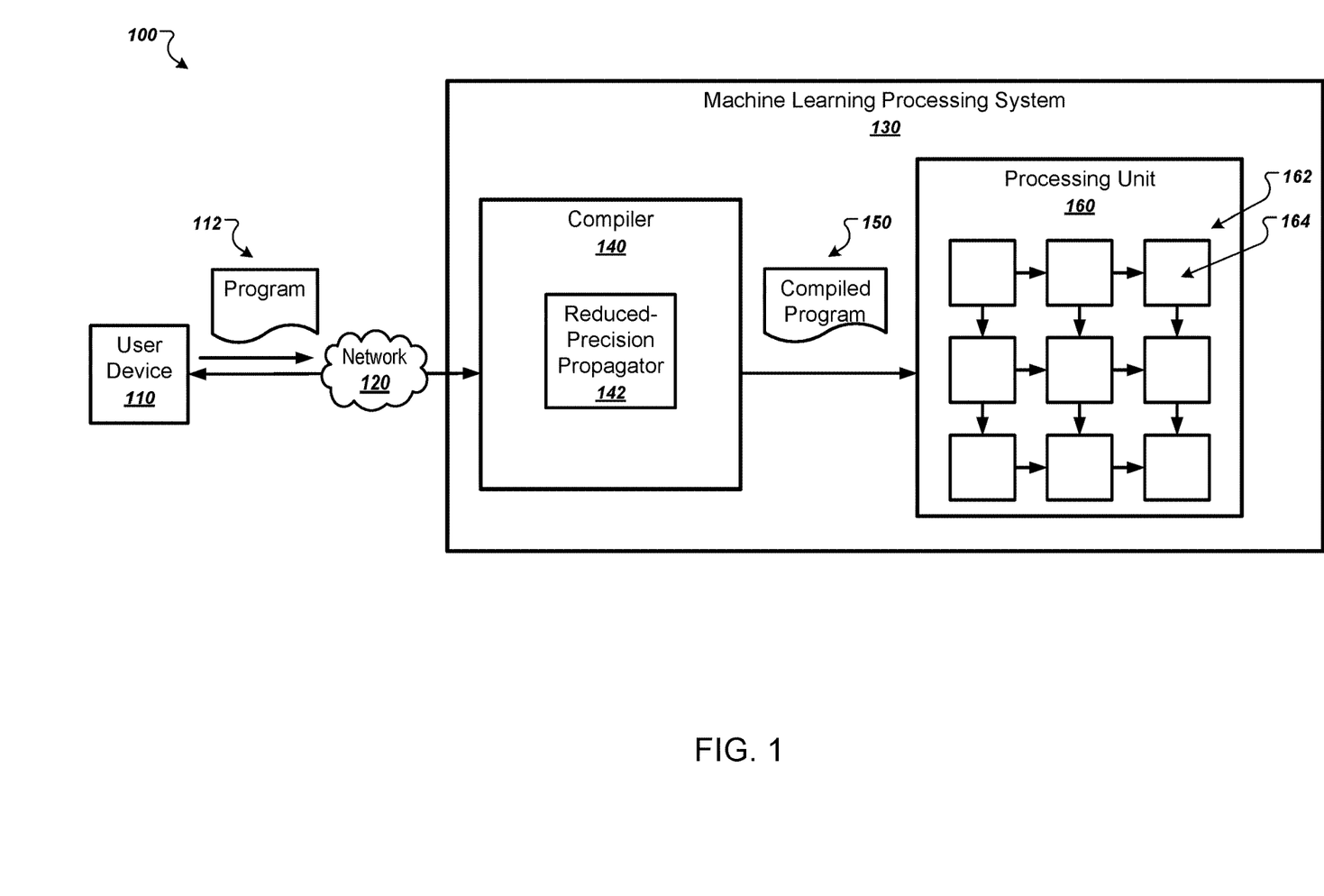
FIG. 1 is a block diagram of an example environment in which a machine learning processing system modifies programs that include machine learning computations and performs machine learning computations using the modified programs.

FIG. 1 is a block diagram of an example environment 100 in which a machine learning processing system 130 modifies programs that include machine learning computations and performs machine learning computations using the modified programs. The machine learning processing system 130 can receive programs 112 from user devices 110 over a data communication network 120, e.g., a local area network (LAN), a wide area network (WAN), the Internet, a mobile network, or a combination thereof.

The programs 112 can include machine learning computations or other numerical workloads. For example, each program 112 can define, or be in the form of, a directed computation graph that specifies operators for a machine learning model. Each operator represents an operation, e.g., a numerical operation, to be performed by a processing unit 160 of the machine learning processing system 130. For example, the operators can represent mathematical operations (e.g., addition, multiplication, maximum, minimum, etc.), tensor operations (e.g., reshaping, transpose, etc.), data replication operations, and/or other appropriate operations.

The graph can include edges between sequential operators. The edges can represent control or data dependencies between operators. A control dependency edge from a first operator to a second operator represents that the second operator is executed after the first operator. A data dependency from a first operator to a second operator represents that the second operator uses data output by the first operator.

The machine learning processing system 130 includes a compiler 140 that compiles the programs 112 into machine instructions for the processing unit 160. The processing unit 160 can include one or more processors, e.g., hardware processors, that execute the machine instructions to perform the computations defined by the programs 112 and/or modified versions of the programs as described below. In this example, the processing unit 160 includes a systolic array 162 of hardware processors 164. Other appropriate arrangements of processors can also be used. For example, the processing unit 160 can be a tensor processing unit (TPU) or a unit with one or more graphics processing units (GPUs).

The compiler 140 can also modify the programs 112, e.g., by modifying the graph, to improve the performance of the processing unit 160 in executing the machine instructions. For example, the compiler 140 can modify the program 112 based on the characteristics of the processing unit 160 that will perform the computations of the program 112. The compiler 140 can also reduce the precision of numerical values on which operations are performed for at least some operators of a machine learning model, e.g., to reduce data storage and memory requirements and increase the speed at which the processing unit 160 performs the computations. In particular, the compiler 140 includes a reduced-precision propagator 142 that identifies operators in the graph of a program 112 for which the precision of the numerical values on which the operators perform operations and the precision of the numerical values output by the operators can be reduced. The reduced-precision propagator 142 can then modify the identified operators to instead perform operations on reduced-precision values and output reduced-precision values.

For example, each operator can be configured to receive, as input, one or more input values (e.g., in the form of a tensor) in a particular computer number format which has a corresponding level of precision. Similarly, each operator can be configured to output one or more output values (e.g., in the form of a tensor) in a particular number format having a corresponding level of precision. The computer number formats of the input(s) can be the same as, or different from, the computer number formats of the output. Some operators can also generate one or more intermediate values that have a different level of precision than the input and/or output values, e.g., 32 bit accumulated values for multiple or convolution operations. The program 112 can specify the configurations of each operator.

The reduced-precision propagator 142 evaluates the graph of operators defined by the program 112 and attempts to reduce the precision of the numerical values of as many operators as possible without negatively affecting the accuracy of the computations performed by the operators. Some operators are sources of lower precision that can be propagated to other operators in the graph. An example source is convert operators that round higher precision values (e.g., F32 values) to F16 values. As the operators downstream from the convert operator use the reduced-precision values, the reduced-precision values can be propagated to one or more operators upstream from the convert operator. Another source is operators that use reduced-precision values internally, such as convolution operators on low-precision hardware. A convolution operator can use higher precision input and output tensors, while internally rounding some or all input values for the convolution operation.

The reduced-precision of operators, e.g., source operators, can be propagated to other operators. For example, the output precision of an operator that is upstream from a source operator (e.g., a convert to F16 operator) can be reduced to match the output precision of a convert operator. In another example, the output precision of an operator that is upstream from an operator that internally rounds values can be reduced to match the internal precision of the operator that internally rounds values.

Propagation of reduced-precision from the output of an operator to the input of the operator is also possible for some types of operators. For example, this propagation of reduced-precision is possible for precision pass-through operators that can pass through the precision of their input values to their output values, e.g., without involving complex floating point arithmetic. Some example precision pass-through operators include tensor reshaping and transpose, data replication via broadcast, maximum, minimum, and absolute values, to name a few examples. If the output precision (precision of the output values) of a precision pass-through operator is reduced, the input precision (precision of the input values) of the precision-pass through operator can also be reduced, though the input precision does not have to be reduced. For example, as described below, there are situations in which the output precision of a precision pass-through operator is reduced, but the input precision remains at the same higher level of precision.

The reduced-precision propagator 142 can propagate reduced-precision using forward and/or backward propagation. In backward propagation, the reduced-precision propagator 142 can start at the end of the graph (or another appropriate starting point in the graph) and evaluate operators in order from the end of the graph to the beginning of the graph. For each operator, the reduced-precision propagator 142 can determine whether reduced-precision can be propagated to the operator from a downstream operator using one or more propagation rules.

In backward propagation, the propagation rules can include a rule that specifies that, if all uses (e.g., downstream operators) of the output of the operator has an input precision that is lower than the output precision of the operator, the output precision of the operator can be reduced to the highest input precision of the uses of the output. A use of the output of an operator is a downstream operator that uses the output of the operator as an input. For example, a downstream operator for a given operator is an operator that receives, as an input, a tensor output by the given operator directly without being modified by another operator. If one or more of the downstream operators uses the same or a higher precision than the output of an operator being evaluated, the reduced-precision propagator 142 can leave the output precision of the operator unchanged or add a de-aliasing convert to the program 112, as described in more detail below.

The propagation rules for backward propagation can also include a rule that specifies that, if the output precision of a precision pass-through operator is reduced, the input precision of the precision pass-through operator can be reduced to match the output precision or marked to indicate that the input precision of the precision pass-through operator can be reduced to match the output precision. In this way, the reduced-precision of the input of the operator may be able to be propagated to one or more upstream operators.

For example, a given operator may output F32 values while each downstream operator computes values using F16 input values, e.g., converted from the F32 output values. If each downstream operator uses lower precision than the given operator, the reduced-precision propagator 142 can adjust the output precision of the given operator to a lower precision, e.g., to the highest level of precision of the downstream operators. Because all uses of the given operator's output are already lower precision before this adjustment, this adjustment does not affect the result of the computation. If the given operator is a precision pass-through operator, the reduced-precision propagator 142 can also mark the input precision of the given operator as only requiring the highest level of precision of the downstream operators. For example, the reduced-precision propagator 142 can generate data that specifies that the input precision of the given operator as only requiring the highest level of precision of the downstream operators.

After evaluating an operator and making precision adjustments to the operator if appropriate, the reduced-precision propagator 142 can move towards the beginning of the graph and evaluate the next operator in the graph, e.g., each upstream operator for the operator. An upstream operator for a given operator is an operator that outputs values that are used as inputs to the given operator. For example, the identified operator may receive, as an input, a tensor output by the upstream operator directly without being modified by another operator.

The reduced-precision propagator 142 can evaluate each upstream operator using the reverse propagation rules. For example, the reduced-precision propagator 142 can determine whether all uses (e.g., downstream operators) of the output of the upstream operator has an input precision that is lower than the output precision of the upstream operator, the reduced-precision propagator 142 can reduce the output precision of the upstream operator to the highest input precision of the uses of the output. If so, the reduced-precision propagator 142 can reduce the output precision of the upstream operator, e.g., to the highest level of input precision of the downstream operators. If one or more of the downstream operators for the upstream operator has an input precision that is higher than the output precision of the upstream operator, the reduced-precision propagator 142 can leave the output precision of the upstream operator unchanged or add a de-aliasing convert to the program 112, as described below.

If the output precision of a precision pass-through operator is reduced, the reduced-precision propagator 142 can reduce the input precision of the precision pass-through operator to match the output precision of the precision pass-through operator. For example, assume that the given operator is a precision pass-through operator for which the output precision was reduced from F32 to F16, the input can be marked as only requiring F16 precision. When evaluating an upstream operator for the given operator, the reduced-precision propagator 142 will determine that the given operator is one of the uses of the upstream operator's output and determine that this use only requires F16 precision based on the marking. If this is the only use of the upstream operator's output, or if each other use requires F16 or lower precision, the reduced-precision propagator 142 can reduce the output precision of the upstream operator to F16 (assuming it was higher than F16 originally). In addition, the reduced-precision propagator 142 can reduce the input precision of the given operator to F16.

The reduced-precision propagator 142 can continue moving along the graph toward the beginning of the graph evaluating each operator and reducing the precision of the operators when appropriate, e.g., until the reduced-precision propagator 142 reaches the beginning of the graph. For acylyic graphs, backward propagation can go in reverse topological order such that an operator is always evaluated before its upstream operators. This is possible when the graph does not have any cycles. If there are cycles in the graph, the reduced-precision propagator 142 can evaluate the operators in an arbitrary order and the reduced-precision propagator 142 can evaluate the graph multiple times until a fixed point is reached, e.g., until the precision of no operators is changed during an evaluation of the graph. Propagation of reduced-precision for loops is described below.

Some operators perform operations on numerical values having a lower level of precision than its input and output values. For example, an operator can receive as input F32 values. The operator can internally round the input values to F16 and perform operations on the F16 values. After performing the operations, the operator can then convert the F16 output value to F32 prior to outputting the value to other operators. When determining the level of precision of the values on which an operator performs operations, the reduced-precision propagator 142 can use the precision of the values on which the actual operations are performed rather than the precision of the input or output values of the operator. In this example, the level of precision would be F16 rather than F32.

In forward propagation, the reduced-precision propagator 142 can start at the beginning of the graph (or another appropriate starting point in the graph) and evaluate operators in topological order from the beginning of the graph to the end of the graph. For each operator, the reduced-precision propagator 142 can determine whether reduced-precision can be propagated to the operator from an upstream operator using one or more propagation rules.

In forward propagation, the propagation rules can include a rule that specifies that, if the output precision of all upstream operators is lower than the input precision of the operator, the input precision of the operator can be reduced to the highest output precision of the upstream operators. In addition, if the input precision of the operator is reduced and the operator is a precision pass-through operator, the output precision of the operator can also be reduced, e.g., to match the input precision of the operator. If one or more of the upstream operators has the same or a higher output precision than the input precision of an operator being evaluated, the reduced-precision propagator 142 can leave the input and output precision of the operator unchanged.

For example, the reduced-precision propagator 142 can determine whether the output precision for each upstream operator for a given precision pass-through operator has lower precision than the input precision of the given operator. If so, the reduced-precision propagator 142 can change the output precision and the input precision of the given operator to match the highest output precision of the upstream operator(s). For example, if the output precision of each upstream operator is F16 and the input precision of the given operator is F32, the reduced-precision propagator 142 can change the input precision of the given operator to F16 and the output precision of the given operator to F16. If the output precision for one or more upstream operators for the given operator has the same or greater precision than the input precision of the given operator, the reduced-precision propagator 142 can leave the input precision and the output precision of the given operator unchanged.

If the reduced-precision propagator 142 changes the input and output precision of the given operator, the reduced-precision propagator 142 can then evaluate each downstream operator for the given operator in the same or a similar manner. For example, the reduced-precision propagator 142 can determine whether the downstream operator is a precision pass-through operator. If so, the reduced-precision propagator 142 can determine whether the output precision for each upstream operator for the downstream operator has lower precision than the output precision of the downstream operator. If so, the reduced-precision propagator 142 can change the input precision and the output precision of the downstream operator to match the highest input precision of the downstream operator.

The reduced-precision propagator 142 can continue moving along the graph towards the end of the graph evaluating each operator and reducing the precision of the operators when appropriate, e.g., until the reduced-precision propagator 142 reaches the end of the graph.

The downstream operators for a particular operator may include some downstream operators that perform operations on values having the same precision as the output precision of the particular operator and some downstream operators that perform operations on values having reduced-precision relative to the output precision of the particular operator. For example, the particular operator may output F32 values. Some of the downstream operators may perform operations on F32 values and some downstream operators may perform operations on F16 values. In this example, the reduced-precision propagator 142 can determine to not reduce the output precision of the particular operator to F16 due to the downstream operators that perform operations on F32 values.

In some implementations, the reduced-precision propagator 142 can determine whether or not to add a de-aliasing convert operator to convert the F32 output values to F16 for the downstream operators that perform operations on F16 values. This allows the downstream operators that perform operations on F32 values to receive the F32 values. In addition, the convert operator converts the F32 values to F16 values for the downstream operators that perform operations on F16 values. The convert operator can be added to the graph between the output of the particular operator and the input of the F16 downstream operators.

As this new convert operator adds overhead to the computations, the reduced-precision propagator 142 can determine to add the convert operator only when there are a sufficiently large number of uses, e.g., greater than a specified threshold number of uses, that will benefit from the conversion to offset the overhead. The number of uses may be based on the type of operations performed on the reduced-precision output values and/or how the reduced-precision values are used. Thus, the reduced-precision propagator 142 can determine whether to add a de-aliasing convert operator based on the type of operation(s) and/or the uses of the reduced-precision output values. For example, the reduced-precision propagator 142 can add the convert operator to convert to the reduced-precision values (e.g., F16) when the values will be used inside a loop and the values are defined outside the loop, such that the converted values are used multiple times.

The reduced-precision propagator 142 can evaluate some types of operators using different techniques. For example, the reduced-precision propagator 142 can use different techniques for determining whether to change the precision for operators that include nested computations, operators that include loops, and aliasing tensor operators. Example aliasing tensor operators include operators that group tensors together for convenience (e.g., without copying them) and operators that pass one of the two input tensors as the output.

A problem with aliasing is that the reverse topological order of the graph used in backward propagation may not be able to guarantee that all uses of an operator's output are evaluated for reduced-precision before the operator itself. To address this problem, the reduced-precision propagator 142 can first assume that the unprocessed uses of the operator's output require only reduced-precision values when it processes operators in reverse topological order using the backward propagation technique. Using the assumption, the reduced-precision propagator 142 can identify a tentative set of operators for precision changes. The tentative set of operators includes operators for which the precision would be reduced if the unprocessed operators are ignored. The reduced-precision propagator 142 can then process the graph again to resolve cases in which only a portion of the operators can be changed to reduced-precision values. Because all operators have been evaluated at this point, the reduced-precision propagator 142 can re-evaluate each operator in reverse topological order based on all downstream operators. If the reduced-precision propagator 142 determines that it can no longer reduce precision of operators based on the complete information, the reduced-precision propagator 142 can determine to not reduce the precision of the operators even if the operator was in the tentative set after the first pass.

Nested computations are graphs that are invoked by operators in the outer computation graph of the program 112. In most cases, the outer operator's inputs are passed as parameters to the nested computation and the nested computation's outputs are passed as the outer operator's output. For example, this can be how the program 112 represents smaller operators that are fused together into a nested computation to form a single fusion operator. For nested computations, the reduced-precision propagator 142 can determine the output precision of the outer operator based on its downstream operators, as described above. The reduced-precision propagator 142 can then change the output precision of the nested computation to match the output precision of the outer operator. The reduced-precision propagator 142 can then determine whether the output precision of the nested computation can be propagated to its parameters.

For example, the reduced-precision propagator 142 can attempt to propagate the output precision of the nested computation to the parameters of the nested computation. If the nested computation includes multiple operators, the reduced-precision propagator 142 can use the backward propagation techniques described above to determine whether the reduced-precision can be propagated all the way back to the parameters. If so, the reduced-precision propagator 142 can change the input precision of the outer operator to match the output precision of the outer operator. The reduced-precision propagator 142 can also change the precision of the operator(s) of the nested computation based on the evaluation of the operator(s) during the backward propagation. If the reduced-precision propagator 142 determines that the reduced-precision cannot be propagated all the way back to the parameters, the reduced-precision propagator 142 can leave the input precision of the outer operator unchanged.

A loop can be represented as a while loop operator that contains two nested computations—the loop condition and the loop body. The output of the loop body is the output of the while loop. The input of the while loop is passed as the input to both the condition and the loop body. The input of the while loop can also alias its output. As a result, inside the loop body, the output of an operator can be eventually used by an earlier operator in the loop body in the next iteration of the loop. To address this problem in propagating reduced-precision values, the reduced-precision propagator 142 can evaluate the nested condition and body computations multiple times until a fixed point is reached, which means that there are no more opportunities to propagate the reduced-precision, and that there are no more aliasing uses to be resolved.

Figure 2:
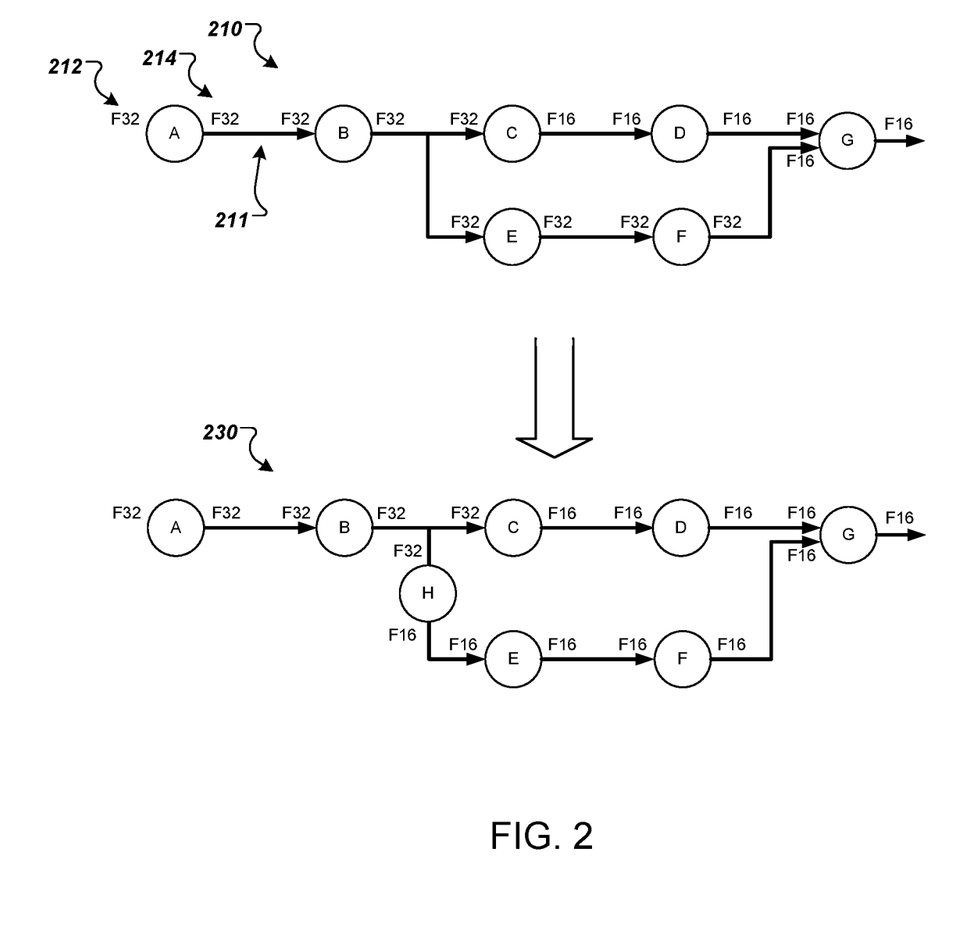
FIG. 2 illustrates a computation graph that includes multiple levels of precision and an updated computation graph after the precision of the values of some operators has been adjusted.

FIG. 2 illustrates a computation graph 210 that includes multiple levels of precision and a modified computation graph 230 after the precision of the values of some operators has been adjusted. The graph 210 can be an input graph for a machine learning model or other numerical workload.

The graph 210 includes operators A-G and edges 211 between pairs of operators that represent control and/or data dependencies between the operators. In this example, some operators perform operations on F32 values and some operators perform operations on F16 values. For each operator, the computation graph 210 specifies an input precision 212 and an output precision 214.

As described above, the reduced-precision propagator 142 can start at one end of the graph 210 and attempt to propagate the reduced-precision forward or backward. This example will also be described using a backward propagation technique starting at operator G.

As the input precision of operator G matches the output precision of operator G and operator G does not have any downstream operators, the reduced-precision propagator 142 can leave operator G unchanged and evaluate its upstream operators, operators D and F. The only operator that uses the output of operator D is operator G. As the input precision of operator G is the same as the output precision of operator D, the reduced-precision propagator 142 may determine to not modify the output precision of operator D.

Similarly, the only operator that uses the output of operator F is operator G. However, the input precision of operator G is lower than the output precision of operator F to F16. Thus, the reduced-precision propagator 142 can reduce the output precision of operator F to F16 without adversely impacting the accuracy of the computation. If operator F is a precision pass-through operator, the reduced-precision propagator 142 can also mark that operator F only requires F16 precision for its input.

The reduced-precision propagator 142 can then attempt to propagate the reduced-precision of operator F to its upstream operator(s). In this example, the only upstream operator for operator F is operator E. The reduced-precision propagator 142 can determine whether each use of the output of operator E can use reduced-precision, e.g., F16. In this example, the only operator that uses the output of operator E is operator F. As the input precision of operator F has been marked as only requiring F16 precision, the reduced-precision propagator 142 can reduce the output precision of operator E to F16 and the input precision of operator F to F16, as shown in the modified computation graph 230. If operator E is a precision pass-through operator, the reduced-precision propagator 142 can mark that operator E only requires F16 precision for its input. If another operator that requires F32 input values used the output of operator E, the reduced-precision propagator 142 would leave operator E unchanged with F32 precision.

The reduced-precision propagator 142 can continue the reduced-precision propagation by attempting to propagate the reduced-precision of operator E to its upstream operator(s). In this example, the only upstream operator for operator E is operator B. The reduced-precision propagator 142 can determine whether each use of the output of operator B can use reduced-precision, e.g., F16.

In this example, operator C and operator E both use the output of operator B. Operator C requires F32 input values and operator E requires BF 16 input values. As operator C requires F32 input values, the reduced-precision propagator 142 can determine to not modify the output precision of operator B from F32 values to reduced-precision values. The reduced-precision propagator 142 can determine whether to add, to the modified computation graph 230, a de-aliasing convert operator to convert the F32 output values from operator B to F16 for operator E. As described above, the reduced-precision propagator 142 can determine whether to add the de-aliasing convert operator based on a number of times the reduced-precision version of the output value will be used, which can be based on the type of operation represented by the operator that uses the reduced-precision version of the output value. For example, if operator E will use each F16 version of the output of operator B at least a threshold number of times, the reduced-precision propagator 142 can determine to add the de-aliasing convert operator. In this example, the reduced-precision propagator 142 has added a de-aliasing convert operator H between operator B and operator E to convert F32 values output by operator B to F16 values for input to operator E. Operator C will still receive F32 values from operator B.

The reduced-precision propagator 142 can also evaluate operator A after evaluating operator B. In this example, the output precision of operator A matches the input precision of its only downstream operator, operator B. Thus, the reduced-precision propagator 142 can leave operator A unchanged. Similarly, the reduced-precision propagator 142 can evaluate operator C after evaluating operator D. In this example, output precision of operator C matches the input precision of its only downstream operator, operator D. Thus, the reduced-precision propagator 142 can leave operator C unchanged.

The reduced-precision propagator 142 can end the reduced-precision propagation process after evaluating each of the operators in the computation graph 210. Of course, if the computation graph 210 includes other sequence of operators, the reduced-precision propagator 142 can evaluate operators in those sequences in an attempt to reduce the precision of as many operators as possible. After the reduced-precision propagation process(s) are completed, the compiler 140 can compile the modified computation graph 230 into machine instructions for the processing unit 160.

Figure 3:
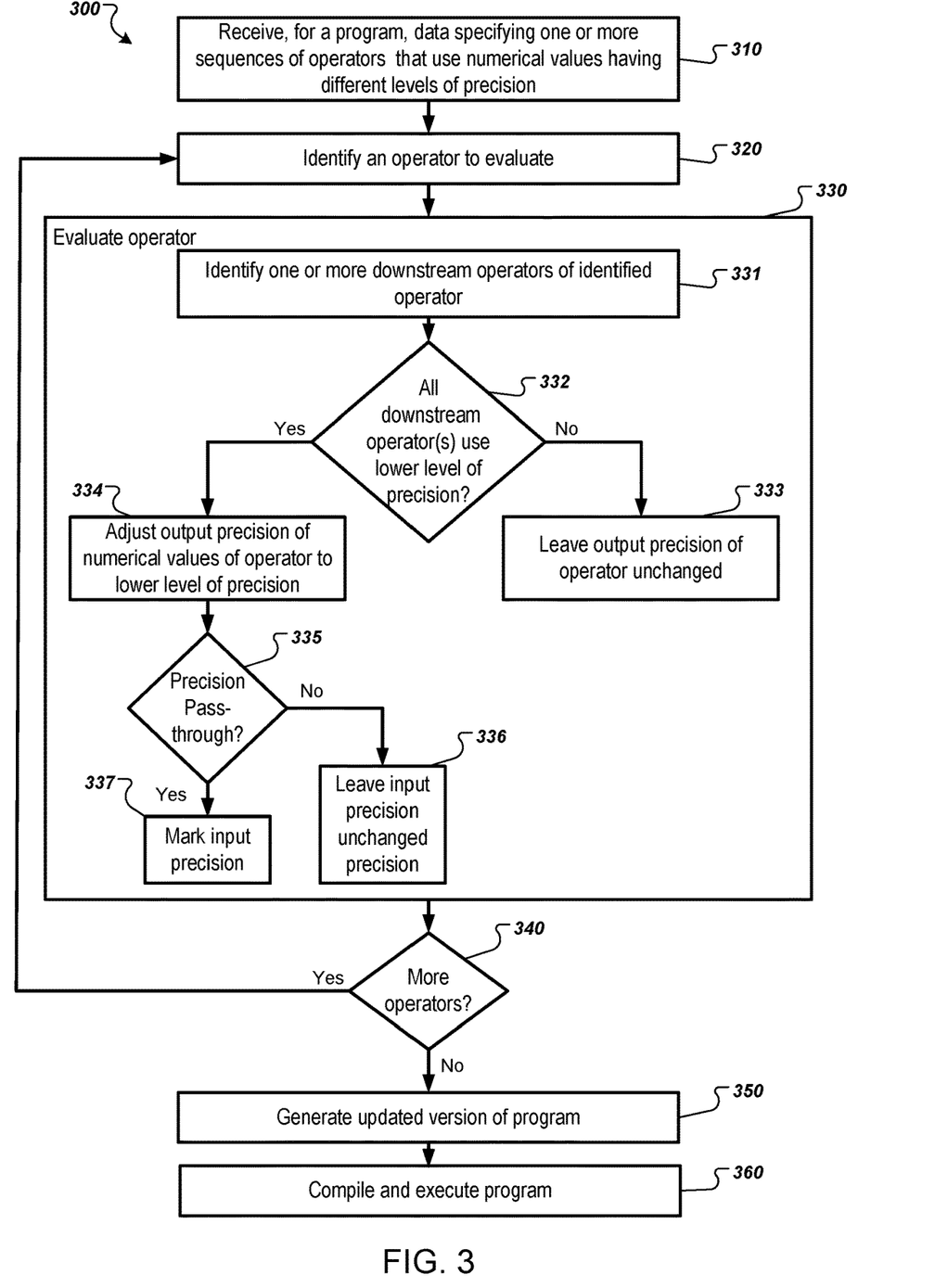
FIG. 3 is a flow diagram that illustrates an example process for propagating reduced-precision values.

FIG. 3 is a flow diagram that illustrates an example process 300 for propagating reduced-precision values. Operations of the process 300 can be performed by a system that includes one or more data processing apparatus. For example, operations of the process 300 can be performed by the machine learning processing system 130 of FIG. 1. The process 300 is an example of a backward propagation technique.

The system receives a program (310). The program can include a computation graph, e.g., a directed computation graph, for a machine learning model or other numerical workload. The computation graph can include operators and edges between pairs of operators. The edges can represent control and/or data dependencies between pairs of operators.

The computation graph can include operators that perform numerical operations on numerical values having a first level of precision and operators that perform operations on numerical values having a second level of precision that is lower than the first level of precision. For example, the numerical values having the first level of precision can be numerical values represented using a first computer number format and the numerical values having the second level of precision can be numerical values represented using a second computer number format. In a particular example, the numerical values having the first level of precision can be F32 values and the numerical values having the second level of precision can be F16 values. The computation graph can also include other levels of precision and their corresponding computer number formats.

The system identifies an operator for evaluation (320). The system can identify, as the first operator to evaluate, the last operator in the computation graph for a backward propagation technique. If the computation graph has cycles, the system can identify an arbitrary operator as the first operator to evaluate.

The system can evaluate the operator to determine whether the system can reduce the output precision and/or the input precision of the operator (330).

This evaluation for each particular operator includes constituent operations 331-335.

The system identifies one or more downstream operators for the particular operator (331). As described above, a downstream operator for a particular operator is an operator that uses the output of the particular operator as an input. For example, a downstream operator may be an operator that receives, as an input, a tensor output by the particular operator directly without being modified by another operator. A downstream operator can be identified in the graph based on an edge from the particular operator to the downstream operator.

The system determines whether each downstream operator of the particular operator performs numerical operations on numerical values having a lower level of precision than the level of precision of the numerical values output by the particular operator (332). The system can determine whether each downstream operator has an input precision that has a lower level of precision than the output precision of the particular operator. For example, if the particular operator outputs F32 values, the system determines whether each downstream operator of the particular operator has F16 input values or other values having lower precision than F32 values.

If not, the system leaves the input precision and the output precision unchanged (333). However, if one or more of the downstream operators has an input precision that is at a lower level of precision than the output precision of the particular operator, the system can consider whether to add an aliasing convert operator, as described below with reference to FIG. 4.

If each downstream operator has an input precision that has a lower level of precision than the output precision of the particular operator, the system reduces the output precision of the numerical output by the particular operator (334). For example, the system can reduce the output precision of the particular operator to the input precision of the downstream operators. If the downstream operators have different levels of input precision, the system can reduce the output precision of the particular operator to the highest level of precision of the downstream operators.

If the system reduces the output precision of the particular operator, the system can determine whether the particular operator is a precision pass-through operator (335). For example, the system can compare the particular operator to a set of operators that are classified as being precision pass-through operations. Some example precision pass-through operators include tensor reshaping and transpose, data replication via broadcast, maximum, minimum, and absolute values, to name a few examples.

If the particular operator is not a precision pass-through operator, the system can leave the input precision of the particular operator unchanged (336). If the particular operator is a precision pass-through operator, the system can mark the input of the particular operator as only requiring the level of precision to which the output of the particular operator has been reduced (337). For example, if the output precision of the particular operator was reduced from F32 to F16, the system can mark the input of the particular operator as only requiring F16 input values.

After evaluating the particular operator, the system determines whether there are more operators to evaluate (340). In this backward propagation technique, the system can determine whether there are any upstream operators that are upstream from the particular operator. If so, the system can return to operation (320) and being the evaluation of each upstream operator. If not, the system can complete the evaluation of the graph.

After evaluating the graph, an updated version of the program is generated (340). The updated version of the program can specify the level of precision and/or computer number format for each operator. For example, the updated version of the program can include a directed computation graph that includes the operators and their corresponding precisions. For operators for which the level of precision was adjusted, the updated version of the program can specify the adjusted levels of precision.

The system compiles and executes the updated version of the program (350). For example, the system can compile the program into machine instructions for a particular processing unit. As described above, reduced-precision can be propagated through the program by a compiler, e.g., at compile time or as part of the compilation process. The compiled program is then executed by a processing unit. Executing the compiled program can include causing one or more processors, e.g., one or more hardware processors, of the processing unit to perform the operations represented by the operators. For operators for which the level of precision was adjusted, the updated compiled program causes the processor(s) to perform the operations using numerical values at the adjusted level of precision.

Figure 4:
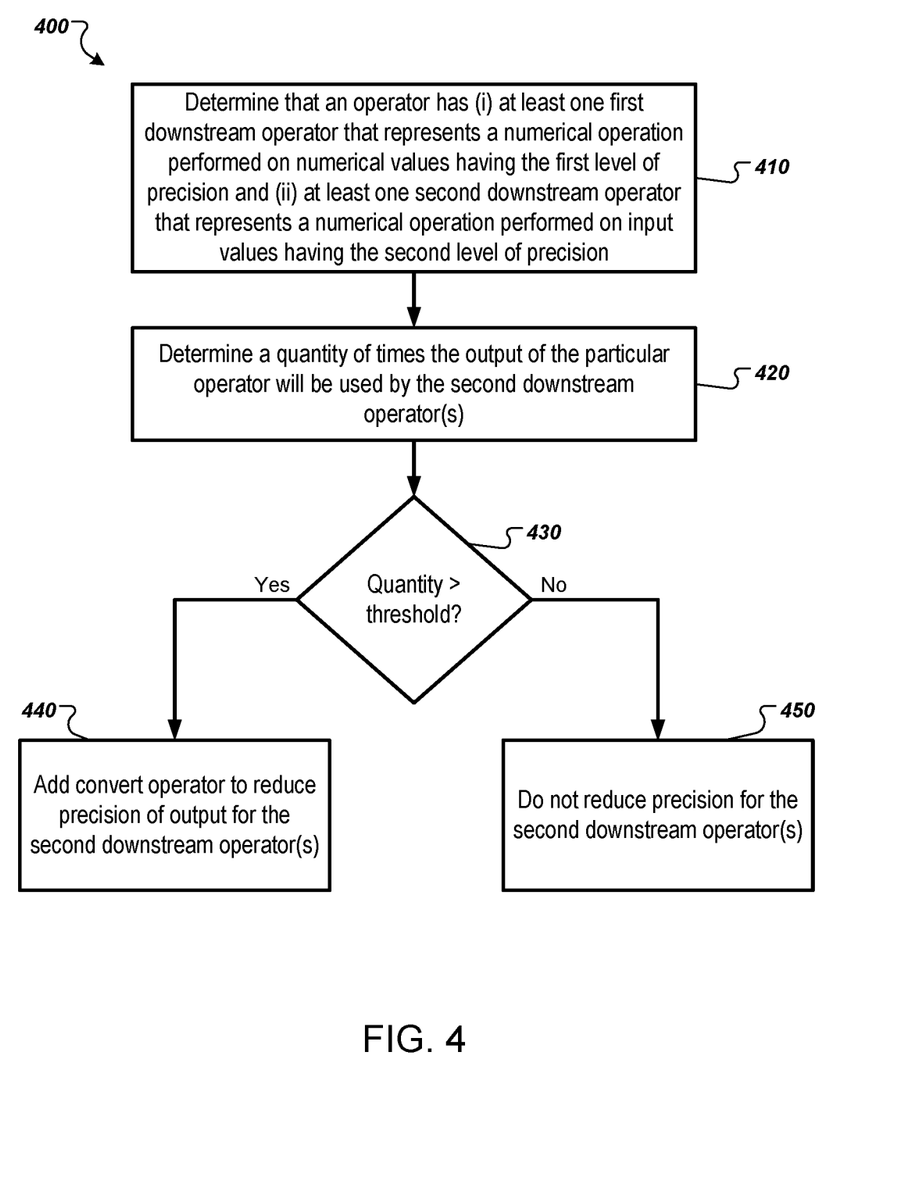
FIG. 4 is a flow diagram that illustrates an example process for adding a de-aliasing convert operator for an operator having downstream operators of different levels of precision.

FIG. 4 is a flow diagram that illustrates an example process 400 for adding a de-aliasing convert operator for an operator having downstream operators of different levels of precision. Operations of the process 400 can be performed by a system that includes one or more data processing apparatus. For example, operations of the process 400 can be performed by the machine learning processing system 130 of FIG. 1.

The system determines that a particular operator has (i) at least one first downstream operator that represents a numerical operation performed on numerical values having the first level of precision (e.g., has an input precision equal to the first level of precision) and (ii) at least one second downstream operator that represents a numerical operation performed on input values having the second level of precision (e.g., has an input precision equal to the second level of precision) (410). For example, the particular operator an operator in a graph of a program that is under evaluation to determine whether the level of precision of the numerical values on which operations performed by the particular operator can be reduced from the first level of precision to the second level of precision. In this example, the second level of precision is lower than the first level of precision.

If one of the downstream operators performs operations on numerical values having the first level of precision, the output values of the particular operator may not be reduced from the first level of precision to the second level of precision. Each second downstream operator may have originally performed operations on numerical values having the first level of precision. The level of precision of the second operators may have been reduced using backward precision-reduction, as described above.

The system determines a quantity of times the output of the particular operator will be used by the second downstream operator(s) (420). For example, if there are multiple second downstream operators, the quantity of times each second downstream operator uses each individual output value output by the particular operator can be summed together. Some operators use a single value output by another operator multiple times. For example, a loop can use the same output value multiple times. The number of times the loop uses the output value can be determined and summed with the quantities of other second downstream operators.

The system determines whether the quantity exceeds a specified threshold (430). For example, the threshold may be specified by a user.

If the quantity exceeds the threshold, the system adds a de-aliasing convert operator to the program (440). The de-aliasing operator can be added to reduce the precision of the output of the particular operator for the second downstream operator(s) from the first level of precision to the second level of precision.

If the quantity does not exceed the threshold, the system does not reduce the precision of the operator for the second downstream operator(s) does not add a de-aliasing operator to the program (450). Instead, the higher precision output value from the particular operator is provided to each of the first operators and the second operators.

Figure 5:
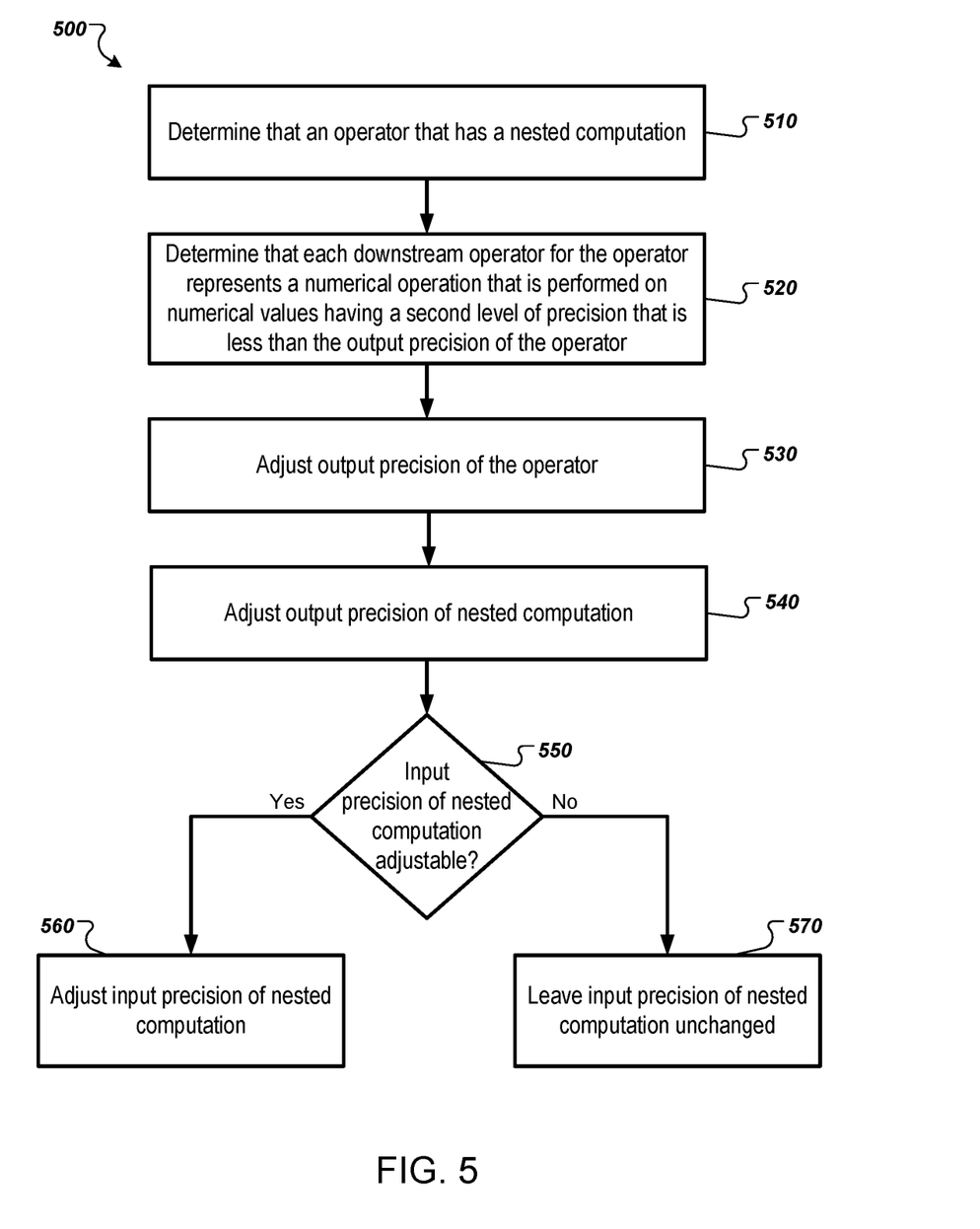
FIG. 5 is a flow diagram that illustrates an example process for adjusting the precision of nested operators.

FIG. 5 is a flow diagram that illustrates an example process 500 for adjusting the precision of nested operators. Operations of the process 500 can be performed by a system that includes one or more data processing apparatus. For example, operations of the process 500 can be performed by the machine learning processing system 130 of FIG. 1. The process can be performed while propagating reduced-precision to operators in a computation graph of a program.

The system determines that an operator has a nested computation (510). For example, the operator may be under evaluation to determine whether the precision of the numerical values on which the operation of the operator can be reduced. The operator can be also be evaluated to determine whether the operator includes a nested computation. The output precision of the operator can be a first level of precision The system determines that each downstream operator for the operator represents a numerical operation that is performed using input values having a second level of precision that is lower than the first level of precision (520). For example, the operator may output F32 values and each downstream operator may perform numerical operations on F16 values. In another example, a determination may be made that each downstream operator performs operations on numerical values having lower precision than the level of precision of the output values of the operator, e.g., as there may be more than one level of precision that is lower than F32.

If each downstream operator for the operator performs numerical operations on numerical values having the second level of precision, the system adjusts the output precision of the operator to the second level of precision (530). In another example, if each downstream operator performs operations on numerical values having lower precision than the level of precision of the output values of the operator, the output precision of the operator can be reduced, e.g., to match the highest level of precision of the downstream operators.

The system also adjusts the output precision of the nested computation of the operator (540). For example, the output precision of the nested computation can be adjusted to match the adjusted output precision of the operator.

The system determines whether the input precision of the nested computation is adjustable (550). If the nested computation includes a single operator and the operator is a precision pass-through operator, the input precision of the nested computation is adjustable. For example, since the precision of a pass-through operator can be passed from the input to the output without complex floating point arithmetic, the input precision can be adjusted to match the output precision. If the nested computation includes a single operator and this operator internally reduces the precision of the numerical values to the precision of the adjusted output precision of the nested computation, the input precision of the nested computation can be adjusted to match the adjusted output precision of the nested computation and the internal precision reduction is no longer required.

If the nested computation includes a sequence of multiple operators, an attempt can be made to propagate the reduced-precision of the output precision of the nested computation from the last operator in the sequence to the first operator in the sequence. For example, backward propagation process, the same as or similar to the process 300 of FIG. 3, can be used to attempt to propagate the reduced-precision to the first operator in the sequence such that the input precision of the first operator matches the adjusted output precision of the nested computation. If successful, a determination is made that the input precision of the nested computation is adjustable.

If the system determines that the input precision of the nested computation is adjustable, the system adjusts the input precision of the nested computation to match the adjusted output precision of the nested computation (560). The input precision of the operator in which the nested computation is nested can also be adjusted to match the adjusted input precision of the nested computation.

If the system determines that the input precision of the nested computation is not adjustable, the system leaves the input precision of the nested computation unchanged (570). In addition, the output precision of the nested computation and the output precision of the operator in which the nested computation is nested can be returned to their original levels of precision, e.g., to the first level of precision.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
receiving data for a program, the data including (i) a set of first operators that each represent a numerical operation performed on numerical values having a first level of precision and (ii) a set of second operators that each represent a numerical operation performed on numerical values having a second level of precision that is a different level of precision from the first level of precision;
identifying, for a first operator of the set of first operators, that a downstream operator of the first operator is a second operator of the set of second operators, the downstream operator being an operator that is performed after the first operator and using an output of the first operator;

adjusting a precision of numerical values output by the operation represented by the first operator to the second level of precision;

wherein whenever (i) the first operator is a precision pass-through operator for which an input precision of the precision pass-through operator matches an output precision of the precision pass-through operator and (ii) an output precision of an upstream operator for the first operator is determined to maintain the first level of precision, the upstream operator being an operator that is performed before the first operator and the output of the upstream operator is used as an input to the first operator, maintaining the precision of numerical values input to the first operator at the first level of precision;

generating a modified version of the program including the adjusted first operator; and causing execution of the modified version of the program by one or more hardware processors.

2. The method of claim 1, wherein before causing execution of the modified version of the program, the method further comprises storing the modified version of the program in a computer storage device, wherein the executing comprises causing the one or more hardware processors to perform the numerical operations with the adjusted precision for the adjusted first operator.

3. The method of claim 1, wherein numerical values having the first level of precision are represented using a first computer number format and numerical values having the second level of precision are represented using a second computer number format different from the first computer number format.

4. The method of claim 1, wherein the data specify a directed graph, wherein the directed graph comprises a node for each operator and an edge between each pair of sequential operators.

5. The method of claim 1, further comprising:

determining, for another first operator of the set of first operators for which an output precision has been adjusted to the second level of precision, that the other first operator is a precision pass-through operator;

determining that an input precision to the other first operator is adjustable, and in response to determining that the other first operator is a precision pass-through operator and the input precision is adjustable, generating data specifying that an input precision of the other first operator requires the second level of precision.

6. The method of claim 1, further comprising:

determining that each of all downstream operators of the first operator is a respective second operator of the set of second operators, and in response to determining that each of all downstream operators of the first operator is a respective second operator, adjusting the precision of numerical values output by the operation represented by the first operator to the second level of precision.

7. The method of claim 1, further comprising:

determining that at least one of all downstream operators of the first operator is another first operator of the set of first operators, and in response to determining that at least one of all downstream operators of the first operator is the other first operator, maintaining the precision of numerical values output by the operation represented by the first operator as the first level of precision.

8. The method of claim 1, further comprising:

determining, for a particular first operator in the set of first operators, that (i) at least one first downstream operator for the particular first operator represents a numerical operation performed on numerical values having the first level of precision and (ii) at least one second downstream operator for the particular first operator represents a numerical operation performed on input values having the second level of precision;

determining that the at least one second downstream operator will use each output of the particular first operator at least a threshold number of times; and in response to determining that the at least one second downstream operator will use each output of the particular first operator at least a threshold number of times, adding, to the modified version of the program, a convert operator that represents an operation that converts each output of the particular first operator to a value having the second level of precision for use by the at least one second downstream operator.

9. The method of claim 1, further comprising:

determining that a particular first operator in the set of first operators includes a nested computation that is nested within the particular first operator;

determining that each downstream operator for the particular first operator represents a numerical operation performed on input values having the second level of precision; and in response to determining that each downstream operator for the particular first operator represents a numerical operation performed on input values having the second level of precision:

adjusting an output precision of the particular first operator to the second level of precision;

adjusting an output precision of the nested computation to the second level of precision;

determining whether an input precision of the nested computation is capable of being adjusted to the second level of precision; and whenever the input precision of the nested computation is capable of being adjusted to the second level of precision, adjusting the input precision of the nested computation to the second level of precision and adjusting an input precision of the particular first operator to the second level of precision.

10. A system comprising:

a data processing; and a memory storage apparatus in data communication with the data processing apparatus, the memory storage apparatus storing instructions executable by the data processing apparatus and that upon such execution cause the data processing apparatus to perform operations comprising:

receiving data for a program, the data including (i) a set of first operators that each represent a numerical operation performed on numerical values having a first level of precision and (ii) a set of second operators that each represent a numerical operation performed on numerical values having a second level of precision that is a different level of precision from the first level of precision;

identifying, for a first operator of the set of first operators, that a downstream operator of the first operator is a second operator of the set of second operators, the downstream operator being an operator that is performed after the first operator and using an output of the first operator;

adjusting a precision of numerical values output by the operation represented by the first operator to the second level of precision;

wherein whenever (i) the first operator is a precision pass-through operator for which an input precision of the precision pass-through operator matches an output precision of the precision pass-through operator and (ii) an output precision of an upstream operator for the first operator is determined to maintain the first level of precision, the upstream operator being an operator that is performed before the first operator and the output of the upstream operator is used as an input to the first operator, maintaining the precision of numerical values input to the first operator at the first level of precision;

generating a modified version of the program including the adjusted first operator; and causing execution of the modified version of the program by one or more hardware processors.

11. The system of claim 10, the operations further comprise: before causing execution of the modified version of the program, storing the modified version of the program in a computer storage device; and wherein the executing comprises causing the one or more hardware processors to perform the numerical operations with the adjusted precision for the adjusted first operator.

12. The system of claim 10, wherein numerical values having the first level of precision are represented using a first computer number format and numerical values having the second level of precision are represented using a second computer number format different from the first computer number format.

13. The system of claim 10, wherein the data specify a directed graph, wherein the directed graph comprises a node for each operator and an edge between each pair of sequential operators.

14. The system of claim 10, further comprising:

determining, for another first operator of the set of first operators for which an output precision has been adjusted to the second level of precision, that the other first operator is a precision pass-through operator;

determining that an input precision to the other first operator is adjustable, and in response to determining that the other first operator is a precision pass-through operator and the input precision is adjustable, generating data specifying that an input precision of the other first operator requires the second level of precision.

15. The system of claim 10, further comprising:

determining that each of all downstream operators of the first operator is a respective second operator of the set of second operators, and in response to determining that each of all downstream operators of the first operator is a respective second operator, adjusting the precision of numerical values output by the operation represented by the first operator to the second level of precision.

16. The system of claim 10, further comprising:

determining that at least one of all downstream operators of the first operator is another first operator of the set of first operators, and in response to determining that at least one of all downstream operators of the first operator is the other first operator, maintaining the precision of numerical values output by the operation represented by the first operator as the first level of precision.

17. A non-transitory computer storage medium encoded with a computer program, the program comprising instructions that when executed by one or more data processing apparatus cause the one or more data processing apparatus to perform operations comprising:

receiving data for a program, the data including (i) a set of first operators that each represent a numerical operation performed on numerical values having a first level of precision and (ii) a set of second operators that each represent a numerical operation performed on numerical values having a second level of precision that is a different level of precision from the first level of precision;

identifying, for a first operator of the set of first operators, that a downstream operator of the first operator is a second operator of the set of second operators, the downstream operator being an operator that is performed after the first operator and using an output of the first operator;

adjusting a precision of numerical values output by the operation represented by the first operator to the second level of precision;

wherein whenever (i) the first operator is a precision pass-through operator for which an input precision of the precision pass-through operator matches an output precision of the precision pass-through operator and (ii) an output precision of an upstream operator for the first operator is determined to maintain the first level of precision, the upstream operator being an operator that is performed before the first operator and the output of the upstream operator is used as an input to the first operator, maintaining the precision of numerical values input to the first operator at the first level of precision;

generating a modified version of the program including the adjusted first operator; and causing execution of the modified version of the program by one or more hardware processors.

18. The non-transitory computer storage medium of claim 17, the operations further comprise: before causing execution of the modified version of the program, storing the modified version of the program in a computer storage device; and wherein the executing comprises causing the one or more hardware processors to perform the numerical operations with the adjusted precision for the adjusted first operator.

19. The non-transitory computer storage medium of claim 17, wherein numerical values having the first level of precision are represented using a first computer number format and numerical values having the second level of precision are represented using a second computer number format different from the first computer number format.

20. The non-transitory computer storage medium of claim 17, wherein the data specify a directed graph, wherein the directed graph comprises a node for each operator and an edge between each pair of sequential operators.

* * * * *